(12) United States Patent
Hack (10) Patent No.: US 8,893,712 B2
(45) Date of Patent: Nov. 25, 2014

(54) METHOD FOR THE PRODUCTION OF A CERAMIC ABSORBER MEMBER FOR SOLAR RADIATION, AND ABSORBER MEMBER

(75) Inventor: Udo Hack, Heroldsbach (DE)

(73) Assignee: Saint-Gobain Industriekeramik Roedental GmbH (DE)

( * ) Notice: Subject to any disclaimer, the term of this patent is extended or adjusted under 35 U.S.C. 154(b) by 711 days.

(21) Appl. No.: 13/145,535

(22) PCT Filed: Jan. 29, 2010

(86) PCT No.: PCT/EP2010/051134
§ 371 (c)(1),
(2), (4) Date: Sep. 20, 2011

(87) PCT Pub. No.: WO2010/086430
PCT Pub. Date: Aug. 5, 2010

(65) Prior Publication Data
US 2012/0017889 A1      Jan. 26, 2012

(30) Foreign Application Priority Data

Jan. 30, 2009   (DE) .......................... 10 2009 006 953

(51) Int. Cl.
| | | |
|---|---|---|
| *F24J 2/02* | (2006.01) | |
| *B28B 11/08* | (2006.01) | |
| *B28B 11/12* | (2006.01) | |
| *F24J 2/48* | (2006.01) | |
| *B23C 5/08* | (2006.01) | |

(52) U.S. Cl.
CPC ........... *F24J 2/484* (2013.01); *B23C 2210/244* (2013.01); *B23C 2210/242* (2013.01); *Y02E 10/40* (2013.01); *B28B 11/08* (2013.01); *B28B 11/12* (2013.01); *B23C 2226/18* (2013.01); *B23C 5/08* (2013.01)

USPC ................ 126/680; 126/658; 29/592; 29/24; 409/131

(58) Field of Classification Search
CPC .............. B23C 5/02; B23C 5/04; B23C 3/00; F24J 2/07; Y02E 10/41; Y02E 10/44
USPC ......... 126/680, 658; 29/592, 21, 24; 409/131, 409/64
See application file for complete search history.

(56) References Cited

U.S. PATENT DOCUMENTS 3,492,986 A * 2/1970 Partiot ........................ 126/92 R
3,874,783 A   4/1975 Cole (Continued)

FOREIGN PATENT DOCUMENTS

CH   669837     4/1989
DE   2244593    4/1974

(Continued)

OTHER PUBLICATIONS

PCT International Report Preliminary Report on Patentability issued on Aug. 2, 2011 for PCT/EP2010/051181 filed on Feb. 1, 2010 in the name of Saint-Gobain Industriekeramik Rodental GMBH (English and German).

(Continued)

*Primary Examiner* — Avinash Savani
(74) *Attorney, Agent, or Firm* — Steinfl & Bruno LLP (57) ABSTRACT

A housing for a solar absorber module for a solar thermal power plant is described. The housing has a first tapered housing section with a first free end to accommodate a ceramic solar absorber element and a second end with a reduced cross-sectional area compared to the first end. The housing also has a second housing section with a cross-section substantially constant over its length. The second housing section is linked to the second end of the first housing section. A wall with a plurality of openings and extending across the entire internal cross-section of the first housing section is arranged in the first tapered housing section. A method for producing such housing is also described, as well as a method for fastening the housing to a support structure.

23 Claims, 6 Drawing Sheets

(56) References Cited

U.S. PATENT DOCUMENTS

| | | | |
|---|---|---|---|
| 4,088,117 A | | 5/1978 | Keyes |
| 4,413,618 A | | 11/1983 | Pitts et al. |
| 4,492,424 A | | 1/1985 | Clegg |
| 4,777,935 A | | 10/1988 | Fricker |
| 5,483,950 A | | 1/1996 | Keintzel et al. |
| 5,497,762 A | | 3/1996 | Rylewski |
| 5,735,262 A | | 4/1998 | Houtman |
| 5,894,838 A | | 4/1999 | Yogey |
| 5,994,251 A | * | 11/1999 | Niwa .......................... 501/127 |
| 6,003,508 A | | 12/1999 | Hoffschmidt et al. |
| 6,066,187 A | | 5/2000 | Jensen et al. |
| 8,028,691 B2 | | 10/2011 | Maxson et al. |
| 8,302,595 B2 | | 11/2012 | Hack |
| 8,662,073 B2 | | 3/2014 | Hack |

FOREIGN PATENT DOCUMENTS

| | | |
|---|---|---|
| DE | 3046181 | 7/1982 |
| DE | 9016385 | 2/1991 |
| DE | 19740644 | 3/1999 |
| DE | 19744541 | 4/1999 |
| DE | 10232387 | 2/2004 |
| DE | 2004/023048 | 3/2004 |
| DE | 10239700 | 5/2004 |
| DE | 10257458 | 6/2004 |
| DE | 102005028863 | 1/2007 |
| DE | 102005055955 | 6/2007 |
| WO | 03/021161 | 3/2003 |
| WO | 2010/086443 | 8/2010 |

OTHER PUBLICATIONS

PCT Written Opinion issued for PCT/EP2010/051181 filed on Feb. 1, 2010 in the name of Saint-Gobain Industriekeramik Rodental GMBH (English and German).

PCT International Report Preliminary Report on Patentability issued for PCT/EP2010/051134 filed on Jan. 29, 2010 in the name of Saint-Gobain Industriekeramik Rodental GMBH (English and German).

PCT Written Opinion issued for PCT/EP2010/051134 filed on Jan. 29, 2010 in the name of Saint-Gobain Industriekeramik Rodental GMBH (English and German).

Fend, T., et al., Solar Radiation Conversion in Cellular Ceramics: Structure, Manufacturing, Properties and Applications 2005, 523-547.

PCT International Search Report for PCT/EP2010/051134 filed on Jan. 30, 2010 in the name of Saint-Gobain Industriekeramik Rodental GMBH.

PCT International Search Report for PCT/EP2010/051181 filed on Feb. 1, 2010 in the name of Saint-Gobain Industriekeramik Rodental GMBH.

Non-Final Office Action mailed on Oct. 27, 2011 for U.S. Appl. No. 13/145,549, filed on Aug. 12, 2011 in the name of Udo Hack.

Final Office Action mailed on May 9, 2011 for U.S. Appl. No. 13/145,549, filed on Aug. 12, 2011 in the name of Udo Hack.

Notice of Allowance mailed on Aug. 9, 2012 for U.S. Appl. No. 13/145,549, filed on Aug. 12, 2011 in the name of Udo Hack.

Notice of Allowance mailed on Nov. 25, 2013 for U.S. Appl. No. 13/632,984, filed on Oct. 1, 2012 in the name of Udo Hack.

* cited by examiner

METHOD FOR THE PRODUCTION OF A CERAMIC ABSORBER MEMBER FOR SOLAR RADIATION, AND ABSORBER MEMBER

CROSS REFERENCE TO RELATED APPLICATIONS

The present application is the US national stage of International Application PCT/EP2010/051134 filed on Jan. 29, 2010, which in turn, claims priority to German Patent Application No. 10 2009 006 953.4 filed on Jan. 30, 2009.

The invention relates to a method for the production of a ceramic absorber member for solar radiation with a first surface and a second surface opposite the first surface, wherein the absorber member has a large number of channels running substantially in straight lines, linking the first surface to the second surface. The invention further relates to an absorber member for solar radiation.

Absorber members for solar radiation are used in so-called solar thermal power plants. Therein, the heat obtained through absorption of concentrated solar radiation in a large number of absorber members is used for power generation. In detail, the incident solar radiation is focused by a large number of mirrors (heliostats) onto a solar absorber unit consisting of a large number of absorber members held on a common support structure such that it is impacted with 200 to 1000-fold intensity. A stream of ambient air sucked in through the channels of the solar absorber member is thus heated to a temperature of 700° C. and is fed in a conduit system to a heat exchanger where the heat is transferred to a water-steam cycle. Here, in a manner known per se, a steam turbine that is connected to a generator is driven. The ambient air cooled after leaving the heat exchanger to a temperature of approx. 150° C. is then fed back to the solar absorber arrangement, where it flows out into the environment under cooling of the housing supporting the absorber member and is partially sucked back in for reheating.

Methods for the production of such absorber members according to the generic portion are known from the prior art in various embodiments. DE 197 40 644 A1 describes a porous absorber member made of a ceramic material. It has, in the region of the surface facing the incident solar radiation, increased porosity that is produced in the absorber member by sandblasting the surface. This reduces the front face of the absorber member that partially reflects the solar radiation such that, accordingly, a greater proportion of the incident radiation penetrates into the pores of the absorber member and can be absorbed there.

According to a another embodiment described in DE 197 40 644 A1, the absorber member has a large number of channels with a rectangular cross-section running in straight lines that are arranged checkerboard-like above and adjacent each other. The intersecting walls bounding the channels in each case are reduced to roughly one fourth of their original wall thickness in their front region facing the solar radiation by sand blasting obliquely striking the surface to a specific depth, as a result of which the solar-radiation-reflecting front face of the absorber member is, as a whole, reduced accordingly.

However, practical investigations have shown that such a reduction of the wall thickness by sandblasting cannot be reproducibly achieved, since the sandblasting merely results in rounding the edges, as a result of which the desired effect, i.e., a reduction of the reflecting surface of the absorber member to increase the radiation absorption, is not satisfactorily achieved through the method described in DE 197 40 644 A1.

Since, for reasons of strength, the absorber member cannot be produced with arbitrarily low wall thicknesses, the absorber members thus have, as a whole, excessive reflectivity for the incident solar radiation such that they do not operate with adequate efficiency.

On that basis, the object of the invention is to provide a method for the production of a ceramic absorber member that is simple to execute and with which highly efficiently operating absorber members can be produced.

The object is accomplished with a method for production of a ceramic absorber member for solar radiation of the type mentioned in the introduction that comprises the following process steps:
   producing an absorber member green preform,
   material-stripping processing of the first surface of the absorber member green preform to enlarge the first surface, and
   firing the green preform.

The particular advantage of the method according to the invention consists in that through material-stripping processing of the absorber member green preform in contrast to the processing of the already fired absorber member, the effective surface for the absorption of solar radiation can be decisively enlarged such that, altogether, the proportion of the solar radiation reflected into the environment by the absorber member is reduced. Since the processing machines required for the material-stripping processing of the green preform are usually available for cleaning fired components, the method according to the invention can be performed in existing systems without appreciable cost.

The enlargement of the first surface of the absorber member for the purpose of increasing the overall rate of absorption can be achieved in various ways. It is critical in each case that the processing take place not on the already fired product, but rather on the green preform, as a result of which effective material stripping is possible with high precision at low processing cost.

According to a first advantageous embodiment of the method according to the invention, the material-stripping processing of the first surface of the absorber member green preform takes place by forming a beam entry face into the wall of at least one channel of the absorber member green preform in the region of its mouth on the first surface, with the beam entry face configured substantially flat and at an angle relative to the axis of the length of the channel.

The forming of a beam entry face in at least one channel has the advantage that in this channel the free opening cross-section through which the solar radiation can enter the channel is significantly enlarged compared to a customary channel opening cross-section. Accordingly, the reflecting surface of the absorber member that surrounds this channel is also reduced such that a smaller proportion of the solar radiation is reflected back into the environment. Due to the inclination of the beam entry face, it is also achieved that the light obliquely incident at different angles depending on the position of the sun and on the position of the respective reflecting minor relative to the first absorber member surface is reflected into the channel, where it is absorbed on the walls of the channel and converted into heat. The fraction reflected back in the channel wall is ultimately also absorbed into the channel walls due to multiple reflection.

In the case of conventional absorber members, appreciable absorption of solar radiation takes place only on a channel length of a few millimeters directly on the surface facing the solar radiation, as is stated in the essay "Cellular Ceramics Use in Solar Radiation Conversion" (Cellular Ceramics: Structure, Manufacturing Properties and Applications by Scheffler, M. and Colombo, P. (Eds.), Wiley-VCH Verlag GmbH & Co. KGaA, Weinheim 2005). This channel length effective for absorption is now decisively enlarged by providing the beam entry face in the context of the embodiment of the method according to the invention.

Preferably, a beam entry face inclined relative to the length of the channel is formed in a majority of the channels of the absorber member green preform. Here, all beam entry faces are preferably oriented parallel to each other. Because of the fact that the beam entry face is formed in a majority of channels, preferably, in all channels of the absorber member green preform, the advantageous effect of this face is multiplied accordingly. Simply for reasons of cost effective manufacturing, the beam entry faces formed in the majority of the channels are configured parallel to each other.

The angle of the beam entry face relative to the direction of the length of the associated channel can be selected differently. In order, on the one hand, to clearly enlarge the effective surface for absorption and, on the other, in order to enable reflection of the solar radiation impacting the beam entry face at an angle deep into the channel, the angle enclosed between the beam entry face and the axis of the length of the channel is preferably 15 to 30°, in particular, approx. 22.5°.

The material-stripping forming of the beam entry face in the absorber member green preform can take place in various ways. Particularly advantageous is milling of the face into the wall of the associated channel.

The milling of the beam entry face can take place with several processing strategies. To mill the beam entry face with the desired angle of inclination, the beam entry face can, according to another embodiment of the invention, be milled into the absorber member green form by means of an asymmetrical side milling cutter with an axis of rotation oriented parallel to the first surface of the absorber member. An asymmetrical side milling cutter is a side milling cutter whose cutting edges disposed on the periphery are arranged non-symmetrically relative to the disk supporting them. The cutting edges preferably enclose an effective milling angle of, for example, 20° to 50°, preferably approx. 30°.

Alternatively to the use of an asymmetrical side milling cutter, the beam entry face can be milled into the absorber member green preform at the desired angle by means of a symmetrical side milling cutter with an axis of rotation oriented inclined relative to the first surface of the absorber member. In the symmetrical milling cutter, the cutting edges are positioned symmetrical to the disk supporting them or to a surface orthogonal to the axis of rotation of the milling cutter. The cutting edges again preferably enclose an angle of 20° to 50°, preferably approx. 30°, with the axis of rotation of the side milling cutter oriented inclined between 5° and 25°, preferably approx. 7.5°, relative to the first surface of the absorber member.

In the absorber member, the channels are typically configured with a rectangular or square opening cross-section, and the opening cross-sections are arranged checkerboard-like on the first surface of the absorber member. If the opening cross-sections of the channels are rectangular, i.e., configured with opposing wide and narrow sides, the beam entry faces are preferably configured in each case in a wide side, in particular over the entire length. As a result, the total effective area composed of the individual beam entry faces is enlarged and the surface reflecting solar radiation back is reduced accordingly.

According to another advantageous embodiment of the invention, in the case of square or rectangular shaped channel opening cross-sections arranged in the checkerboard pattern, the beam entry face can be milled in a plurality of channels of the absorber member such that the cutter mills the beam entry faces line by line into the respective wall of the channels arranged in a line, which represents a particularly time-efficient processing strategy.

According to another particularly advantageous embodiment of the invention, the asymmetric side milling cutter is configured as a multichannel cutter and mills a plurality of beam entry faces simultaneously into the absorber member. Here, the plurality of simultaneously milled beam entry faces corresponds to the number of the individual cutters arranged on the axis of rotation of the multichannel cutter. As a result, a large number of beam entry faces is produced in a very short time.

For the further enlargement of the surface, provision can be made, finally, that the front edges of the channel walls of the absorber member fired after the enlargement of the surface be slightly rounded by means of sandblasting.

Alternatively to producing one or a plurality of beam entry faces by material-stripping processing of the absorber member green preform by milling, according to another embodiment of the invention, provision can be made that the material-stripping processing take place through sandblasting of the first surface of the absorber member green preform. By sandblasting of the absorber member green preform, significant material stripping is achieved on the first surface of the absorber member green preform. In this process, the edges of the boundary walls of the channels can be rounded concavely, which is only successfully accomplished through sandblasting processing of the absorber member green preform.

However, it is likewise also possible to form a beam entry face in the absorber member green preform by sandblasting. For this, the absorber member is preferably oriented inclined relative to the sandblasting nozzle and a relative movement produced between the sand beam and the first surface. Obviously, the angle of inclination determines the angle between the beam entry face and the axis of the length of the channel. In order to produce the most possible beam entry faces in parallel, provision can also be made that the sandblasting nozzles are displaced in an oscillating movement preferably orthogonal to the relative movement in order to impact the first surface of the absorber member over as much surface area as possible.

As a processing strategy, according to another teaching of the invention, provision can be made that the beams of sand are incident on the first surface from two sides symmetrically to the normal of the first surface, as a result of which a particularly uniform surface structure develops. If the opening cross-sections of the channels on the first surface are again configured as rectangles and arranged checkerboard-like such that the boundary walls of the channels intersect at right angles in the customary manner, it is reasonable to repeat the sandblasting after rotating the absorber member green preform by 90° to obtain the desired uniformly rounded surface structures on all edges.

As investigations by the applicant have revealed, absorber members with hexagonal channel cross-sections like honeycombs enable particularly effective radiation coupling since with a hydraulic diameter unchanged compared to square cross-sections and equal cross-section area, a heat exchange area enlarged by 15% can be obtained. Also, with hexagonal channel cross-sections, it is possible to produce beam entry faces by angled impact on the first surface of the absorber member.

A significant surface enlargement in the range of 20% can, for example, be obtained by sandblasting the first surface of the absorber member green preform with a pressure between 3.5 and 5 bar with a processing time between 2 and 10 sec.

A further object of the invention is to report an absorber member for solar radiation that is distinguished by very high absorption of the incident solar radiation and thus by very high efficiency.

The object is accomplished according to the invention with an absorber member according to the generic portion of claim 17 in that in the channel wall of at least one channel in the region of its mouth on the first surface, a beam entry face is configured at an angle relative to the axis of the length of the channel and configured substantially flat such that solar radiation incident on the beam entry faces is reflected into the respective channel.

What has been said above applies with regard to the advantages of the absorber member according to the invention.

In particular, the forming of a beam entry face in at least one channel of the absorber member has the effect that in this channel the free opening cross-section through which the solar radiation can enter the channel is clearly enlarged compared to a customary channel opening cross-section. Accordingly, the reflecting surface of the absorber member that surrounds this channel is also reduced such that a smaller proportion of the solar radiation is reflected back into the environment. Due to the inclination of the beam entry face, it is achieved that the light obliquely incident at different angles depending on the position of the sun and on the position of the respective reflecting mirror relative to the first absorber member surface is reflected into the channel, where it is absorbed on the walls of the channel and converted into heat. The fraction reflected back in the channel wall is ultimately also absorbed into the channel walls due to multiple reflection.

Preferably, a beam entry face inclined relative to the length of the channel is configured in a majority of the channels of the absorber member. Here, all beam interfaces are preferably oriented parallel to each other. A particularly efficient conversion of solar radiation into heat is achieved with such absorber members wherein all channels are provided with such a beam entry face.

The angle of the beam entry face relative to the direction of the length of the associated channel can be selected differently. In order, on the one hand, to clearly enlarge the effective surface for absorption and, on the other, in order to enable reflection of the solar radiation impacting the beam entry face an angle deep into the channel, the angle enclosed between the beam entry face and the axis of the length of the channel is preferably 15 to 30°, in particular, approx. 22.5°.

The channels in the absorber member can, for their part, have different cross-section geometries. Expediently, they each have a rectangular opening cross-section, with the opening cross-sections arranged checkerboard-like on the first surface of the absorber member.

Absorber members with hexagonal channel cross-sections that are arranged honeycomb-like in the absorber member enable particularly effective radiation coupling since with a hydraulic diameter unchanged compared to square cross-sections and equal cross-section area, a heat exchange area enlarged by 15% can be obtained.

The beam entry face provided according to the invention in at least one channel can be introduced into the absorber member in different ways. It is also obviously possible to form the absorber member from the outset with the beam entry face. However, preferably, the beam entry face is formed later in the absorber member by milling.

If the absorber member is made of a ceramic material, in particular of silicon carbide or silicon-infiltrated silicon carbide, the beam entry face is, according to a particularly advantageous embodiment of the invention, formed by milling in the green preform of the absorber member, i.e., in the not yet fired absorber member. The forming of the beam entry faces by sandblasting is also possible. The advantage is that the beam entry face can be introduced substantially more precisely more cost-effectively in the green preform than would be the case with a finished fired component.

According to another advantageous embodiment of the invention, the edges of the milled channel walls on the first surface of the absorber member are additionally rounded. Preferably, this rounding takes place by sandblasting. Again, if the absorber member is a ceramic component, it is critical that the rounding of the walls by sandblasting take place on the finished fired component since processing of the green preform by sandblasting would result in an undesirable deformation of the beam entry face.

In the following, the invention is explained in detail with reference to drawings depicting an exemplary embodiment. They depict.

Figure 1:
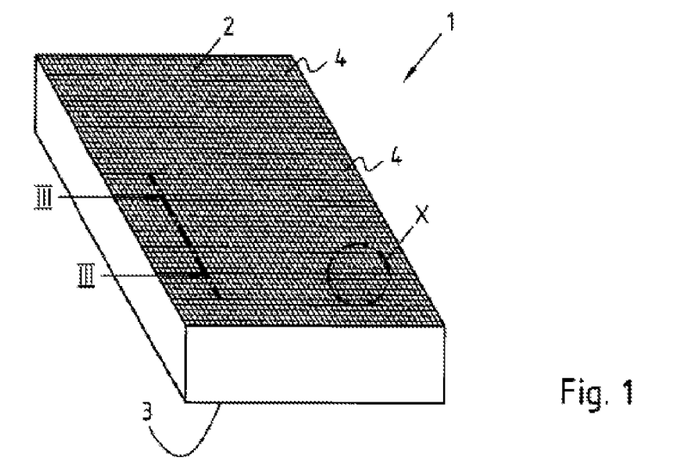
FIG. 1 an absorber member for solar radiation in perspective view.

FIG. 1 depicts an absorber member 1 for solar radiation in perspective representation. The absorber member 1 is configured as a flat component with a first surface 2 and a second surface 3 opposite the first surface 2, wherein the absorber member 2 has a large number of channels 4 running in substantially straight lines, linking the first surface 2 to the second surface 3. The absorber member 1 is made in this case of silicon carbide, preferably silicon-infiltrated silicon carbide.

Figure 2:
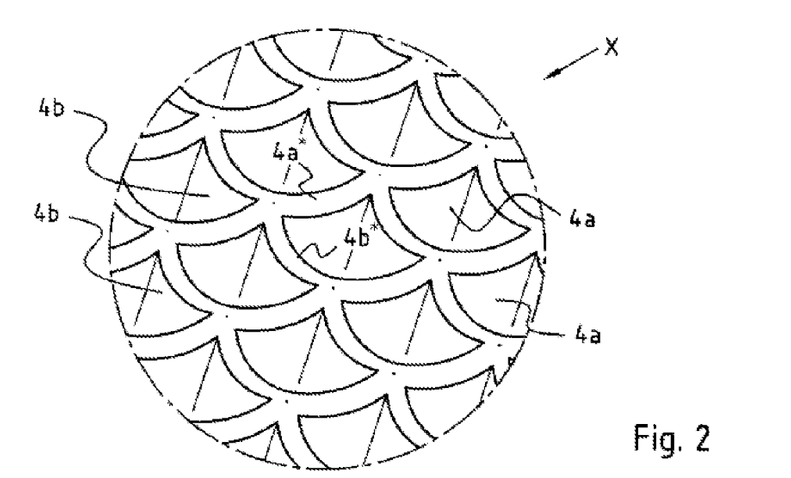
FIG. 2 the detail X from the absorber member of FIG. 1.
Figure 3:
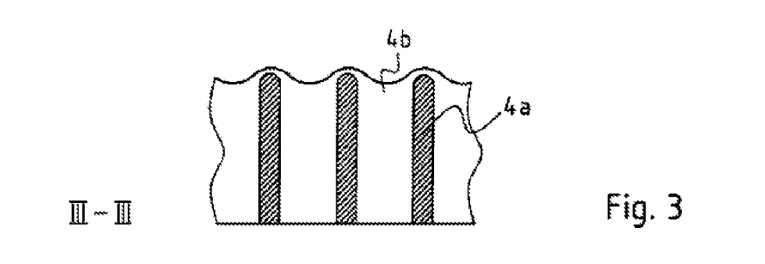
FIG. 3 the absorber member of FIG. 1 in cross-section detail along cutting line in FIG. 1, FIG. 4 another absorber member for solar radiation in perspective view, FIG. 5 the absorber member of FIG. 4 in cross-section detail along cutting line V-V in FIG. 4, FIG. 6 the absorber member of FIG. 4 in cross-section according to FIG. 5 with solar radiation from different directions FIG. 7a-c a method for the production of an absorber member according to FIGS. 4 and 5.

The absorber member 1 of FIG. 1 is produced according to the invention initially as a green preform, with the green preform processed by material stripping in order to effectively enlarge the first surface 2 and thus obtain more effective absorption of the solar radiation. In the exemplary embodiment of FIG. 1 through 3, the absorber member 1 as a green preform is processed by sandblasting such that the edges 4a* of the boundary walls 4a of the channels 4 are concavely rounded, as can be seen in FIG. 2, which depicts the detail X of FIG. 1. The contours depicted can, for example, be produced by sandblasting with a pressure between 3.5 and 5 bar and a processing time between 2 and 10 sec. For this, blasting is preferably carried out obliquely from two directions symmetrically to the normal onto the surface 2 and the surface rotated by 90° after the processing time mentioned such that both groups of edges 4a* and 4B* positioned orthogonally relative to each other are rounded in the manner depicted. As investigations of the applicant have revealed, surface enlargements between 15 and 20% can thus be obtained.

Figure 4:
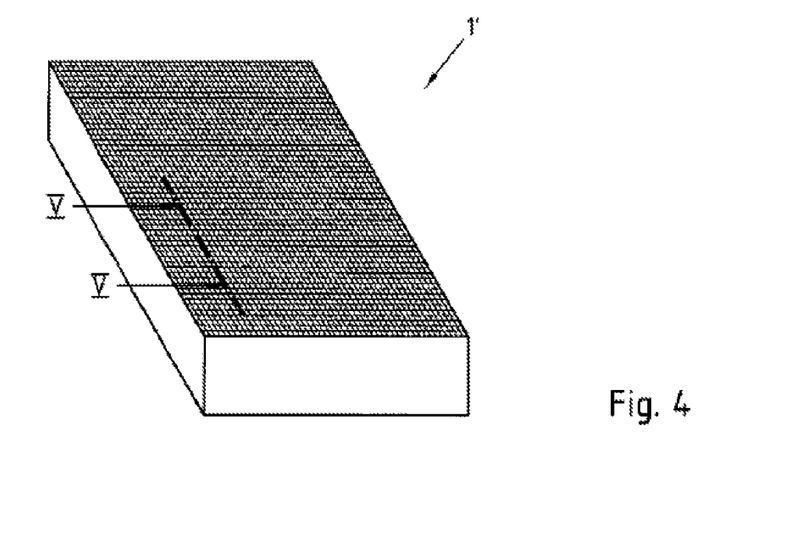

FIG. 4 depicts another absorber member 1' produced according to the invention. Here, after forming the green preform, a beam entry face 5' is formed in each case in all channels 4' of the green preform by material-stripping processing. Here, this takes place by milling.

Figure 5:
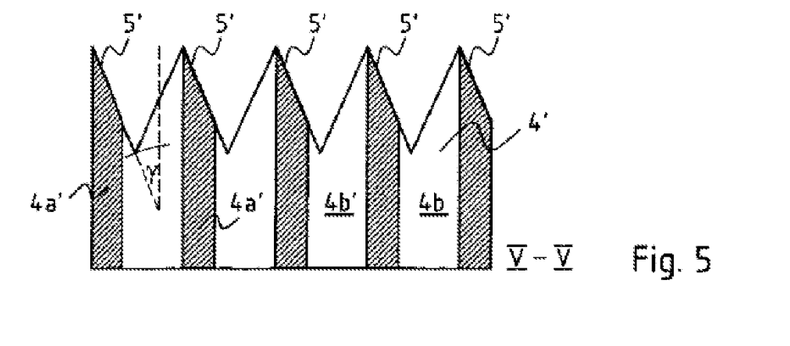

The beam entry face 5' is formed in the wall 4a' of the absorber member 1' in the region of the mouth of the respective channel 4' on the first surface 1'. As is further discernible from FIG. 5, the beam entry faces 5' are configured flat and are all parallel to each other, which simplifies production in a common manufacturing step. They are also configured inclined at an angle γ Relative to the axis of the length of the respective channel 4' and, accordingly, reflect the obliquely incident solar radiation deep into the interior of the associated channel 4', as a result of which the coupling of the solar radiation into the absorber member 1' is maximized.

Figure 6:
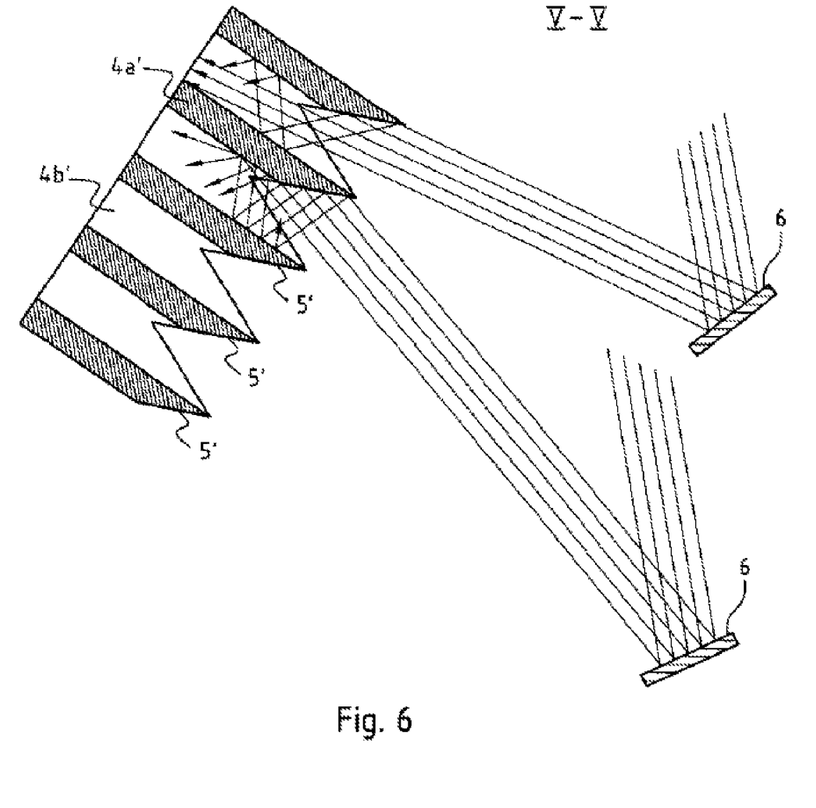

FIG. 6 depicts how the radiation is coupled with the help of the beam entry faces 5' into the interior of the channels 4'. Depicted here by way of example are two mirrors 6 that are located at different distances from the absorber member 1' and, accordingly, reflect the strictly parallel solar radiation incident on the mirrors 6 to the absorber member 1' at different angles. As further depicted in FIG. 6, the beams incident on the beam entry faces 5' are reflected away by the first surface 2' into the interior of the channels 4', where they are absorbed through multiple reflection on the channel walls 4a', 4b' and are converted into heat.

Figure 7A:
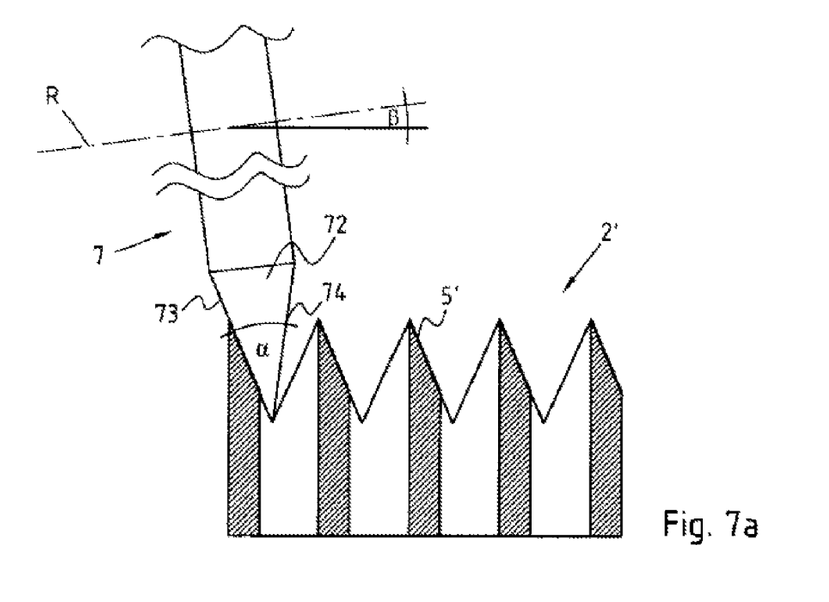
Figure 7B:
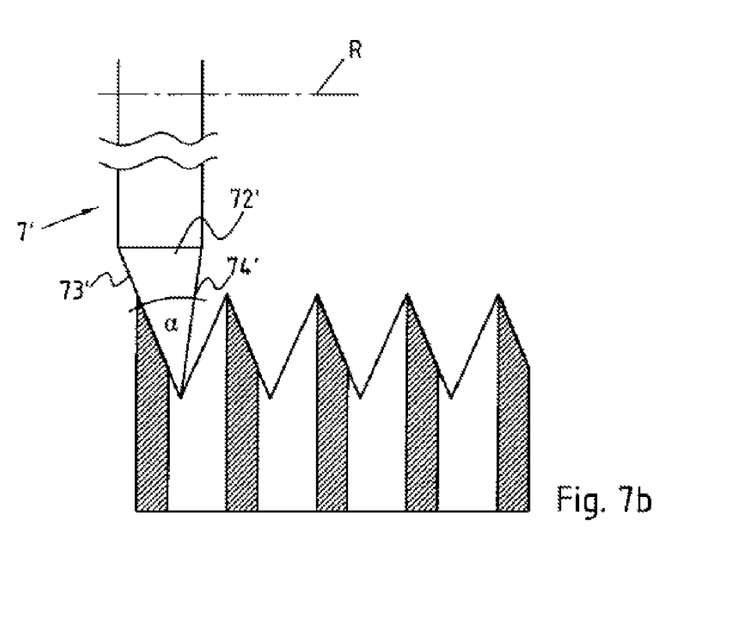
Figure 7C:
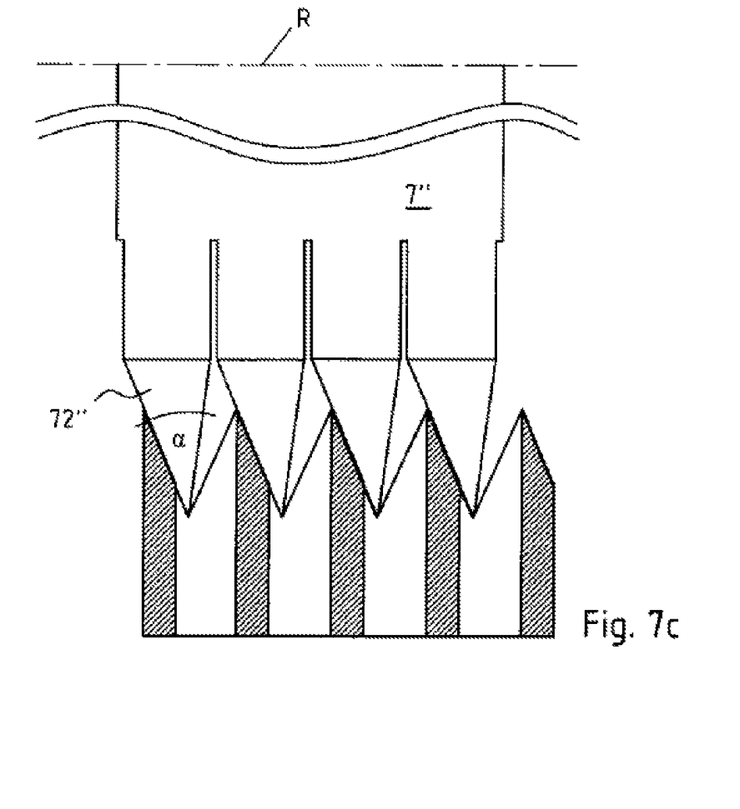

FIG. 7a-c depict various processing strategies for the forming of the beam entry faces into the channel walls 4a', 4b'. In FIG. 7a, the beam entry face 5' is milled in by means of a symmetrical side milling cutter 7, that is inclined relative to the surface 2' of the absorber member approx. by the angle approx. β=7.5°. The processing in the absorber member green preform 1' is done line by line. Here, the term "symmetrical" means that the angle bisector of the cutting faces 73, 74 of the cutting edge 72 positioned at an angle of α=approx. 30° relative to each other is perpendicular to the axis of rotation R of the milling cutter.

In the case of FIG. 7b, the beam entry faces 5' are introduced with an asymmetrical side milling cutter 7'. Here, the axis of rotation of the cutter 7' is parallel to the surface 2' of the absorber member 1', but the angle bisector of the cutting faces 73', 74' of the cutting edge 72' is not positioned at a right angle relative to the axis of rotation R of the milling cutter.

FIG. 7c depicts particularly time-efficient processing. Here, a multichannel cutter 7" with a large number of cutting edges 72' arranged on a cylinder is used. These are each configured identical to the asymmetrical cutting edges 72' of FIG. 7b and rotatingly around a common axis R. This enables simultaneously forming a large number of beam entry faces 5' in the absorber member green preform 1'.

Figure 8:
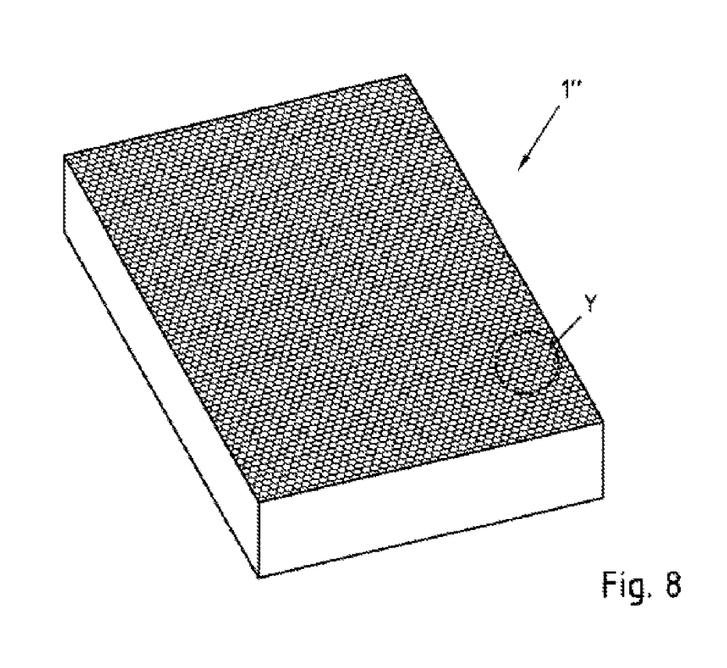
FIG. 8 another absorber member for solar radiation in perspective view.
Figure 9:
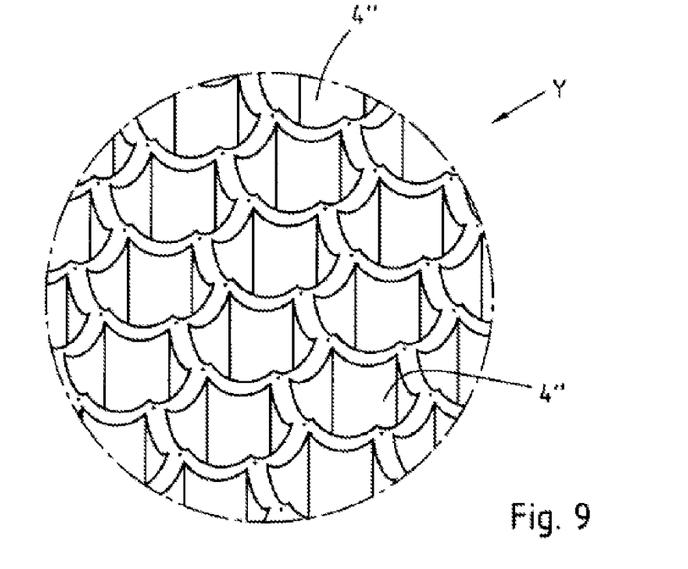
FIG. 9 the detail Y from the absorber member of FIG. 8.

FIG. 8 depicts another absorber member 1" for solar radiation in perspective view. It has channels 4", arranged in a honeycomb pattern, each with a hexagonal cross-section, which have, compared to channels with a square cross-section, a an effective area for absorption further increased by approx. 15%, with the hydraulic diameter and the cross-section area unchanged. By sandblasting the green preform, the front edges of the channel 4" can be rounded analogously to the exemplary embodiment of FIG. 1 through 3, as can be seen in the detail Y of FIG. 9. By sandblasting, it is also possible to produce parallel beam entry faces in the channels (not shown). For this, the first surface of the absorber is oriented inclined relative to the sand beam and moved relative to the sandblasting nozzle or sandblasting nozzles. In order to impact a maximum possible area of the absorber member, it is advantageous to allow the sandblasting nozzles to oscillate in a direction preferably orthogonal to the relative movement between the absorber member and the nozzle.

What is claimed is:

1. A method for production of a ceramic absorber member for solar radiation, the absorber member comprising a first surface, a second surface opposite the first surface, and a large number of channels running substantially in straight lines, linking the first surface to the second surface, the method comprising:
   producing an absorber member green preform,
   material-stripping processing the first surface of the absorber member green preform to enlarge the first surface, and
   firing the absorber member green preform,
      wherein the material-stripping processing of the first surface of the absorber member green preform occurs by forming a beam entry face in a wall of at least one channel of the absorber member green preform in a region of a mouth of the absorber member green preform on the first surface, the beam entry face being configured substantially flat and at an angle relative to an axis of the length of the channel.

2. The method according to claim 1,
   wherein the beam entry face is formed in a wall of each one of a plurality of channels of the absorber member green preform.

3. The method according to claim 2,
   wherein the beam entry faces are configured parallel to each other.

4. The method according to claim 1,
   wherein the angle between the beam entry face and the axis of the length of the channel is 15° to 30°.

5. The method according to claim 1,
   wherein the beam entry face is milled into the absorber member green perform.

6. The method according to claim 5,
   wherein the beam entry face is milled into the absorber member green form by way of an asymmetrical side milling cutter with an axis of rotation oriented parallel to the first surface of the absorber member.

7. The method according to claim 6,
   wherein the cutting faces of the asymmetrical side milling cutter enclose an angle of 20to 50°.

8. The method according to claim 5,
   wherein the beam entry face is milled into the absorber member green preform by way of a symmetrical side milling cutter with an axis of rotation oriented inclined relative to the first surface of the absorber member.

9. The method according to claim 8,
   wherein the cutting faces of the symmetrical side milling cutter enclose an angle of 20° to 50°, with the axis of rotation of the side milling cutter oriented inclined between 5° and 25° relative to the first surface of the absorber member.

10. The method according to claim 5,
    wherein the channels of the absorber member, each with a rectangular opening cross-section, are arranged checkerboard-like on the first surface of the absorber member, with the beam entry face milled in in a plurality of channels of the absorber member such that the cutter mills in the beam entry faces line by line into the wall of the channels arranged in a line.

11. The method according to claim 10,
    wherein the side milling cutter is configured as a multichannel cutter and mills in a plurality of beam entry faces simultaneously into the absorber member.

12. The method according to claim 1,
    wherein front edges of the channel walls of the fired absorber member are rounded by sandblasting.

13. The method according to claim 1,
wherein the material-stripping processing takes place by sandblasting of the first surface of the absorber member green preform.

14. The method according to claim 13,
wherein beams of sand are incident on the first surface from two sides symmetrically to the normal of the first surface.

15. The method according to claim 13,
wherein the sandblasting of first surface of the absorber member green preform takes place with a pressure between 3.5 and 5 bar with a processing time between 2 and 10 sec.

16. An absorber member for solar radiation, comprising:
a first surface and a second surface opposite the first surface, and
a large number of channels running substantially in straight lines, linking the first surface to the second surface,
wherein in a channel wall of at least one channel in a mouth region of the absorber member on the first surface, a beam entry face is configured at an angle relative to an axis of the length of the channel and configured substantially flat such that the solar radiation incident on the beam entry faces is reflected into the respective channel,
wherein the absorber member is made of a ceramic material,
wherein the channels each have a rectangular opening cross-section, wherein the opening cross-sections are arranged checkerboard-like on the first surface of the absorber member, and
wherein the beam entry face is configured on a wide side of the rectangular opening cross-section in the channel wall.

17. The absorber member according to claim 16,
wherein the beam entry face is provided in a large number of channels of the absorber member and the beam entry faces are oriented parallel to each other.

18. The absorber member according to claim 17,
wherein the angle enclosed between the beam entry face and the axis of the length of the channel is 15° to 30°.

19. The absorber member according to claim 16,
wherein the channels each have a hexagonal opening cross-section, wherein the opening cross-sections are arranged honeycomb-like on the first surface of the absorber member.

20. The absorber member according to claim 16,
wherein the beam entry face is formed by milling into the absorber member.

21. The absorber member according to claim 16,
wherein the ends of the channel walls on the first surface of the absorber member are rounded.

22. The absorber member according to claim 16,
wherein the absorber member is manufactured from silicon carbide, silicon infiltrated silicon carbide or nitride bonded silicon carbide.

23. An absorber arrangement comprising a plurality of absorber members according to claim 16.

* * * * *